United States Patent [19]

Kokubo

[11] Patent Number: 4,984,002
[45] Date of Patent: Jan. 8, 1991

[54] VIDEO CAMERA SHUTTER CONTROL BY CHARGE ACCUMULATION TIME OF CCD IMAGES

[75] Inventor: Yuji Kokubo, Kanagawa, Japan

[73] Assignee: Sony Corporation, Tokyo, Japan

[21] Appl. No.: 461,926

[22] Filed: Jan. 8, 1990

[30] Foreign Application Priority Data

Jan. 12, 1989 [JP] Japan .................. 64-005269

[51] Int. Cl.[5] .................. A04N 3/15; A04N 5/335
[52] U.S. Cl. .................. 358/213.13; 358/213.19; 358/213.11
[58] Field of Search .................. 358/213.11, 213.13, 358/219

[56] References Cited

U.S. PATENT DOCUMENTS

| 4,504,866 | 3/1985 | Saito | 358/213.13 |
| 4,603,354 | 7/1986 | Hashimoto et al. | 358/213 |
| 4,686,572 | 8/1987 | Takatsu | 358/213.19 |
| 4,763,196 | 8/1988 | Sakai | 358/213.13 |

FOREIGN PATENT DOCUMENTS

| 0265925 | 4/1988 | European Pat. Off. . |
| 0280511 | 8/1988 | European Pat. Off. . |
| 2196811 | 5/1988 | United Kingdom . |

Primary Examiner—James J. Groody
Assistant Examiner—Glen Burgess
Attorney, Agent, or Firm—Hill, Van Santen, Steadman & Simpson

[57] ABSTRACT

In a charge-coupled imager in which an electronic shutter is controlled by varying an effective charge accumulating time of a charge-coupled device, according to this invention, the accumulation is started in synchronism with the trigger signal applied from the outside, the charge is accumulated only during a period of time determined by the shutter speed setting signal, and the accumulated charge is read out, whereby the charge accumulating time (exposure time) can be varied in such a manner that the starting of exposure time is made constant while its ending is varied. Therefore, the charge-coupled imager of inter-line transfer type of the invention can be made inexpensive and applied to a video processing apparatus such as a so-called machine-vision in which man's visual sense is not assumed.

5 Claims, 5 Drawing Sheets

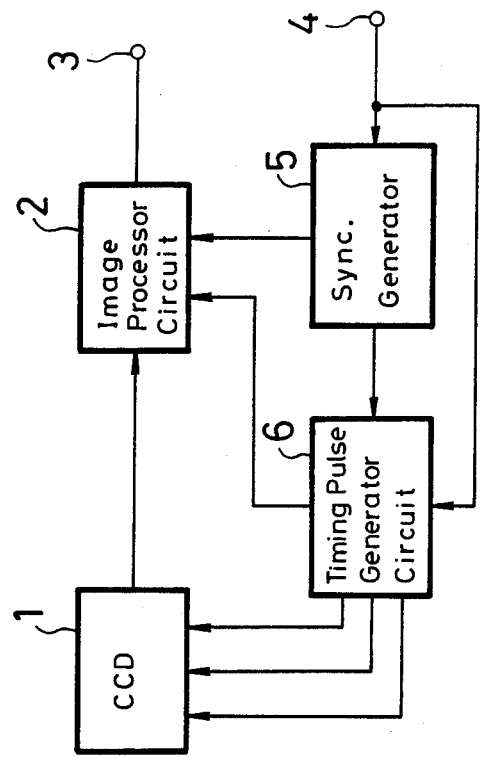
FIG. 2
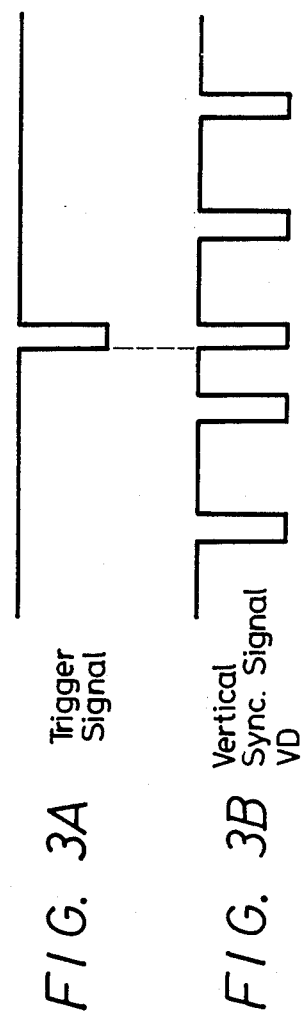
FIG. 3A  Trigger Signal
FIG. 3B  Vertical Sync. Signal VD

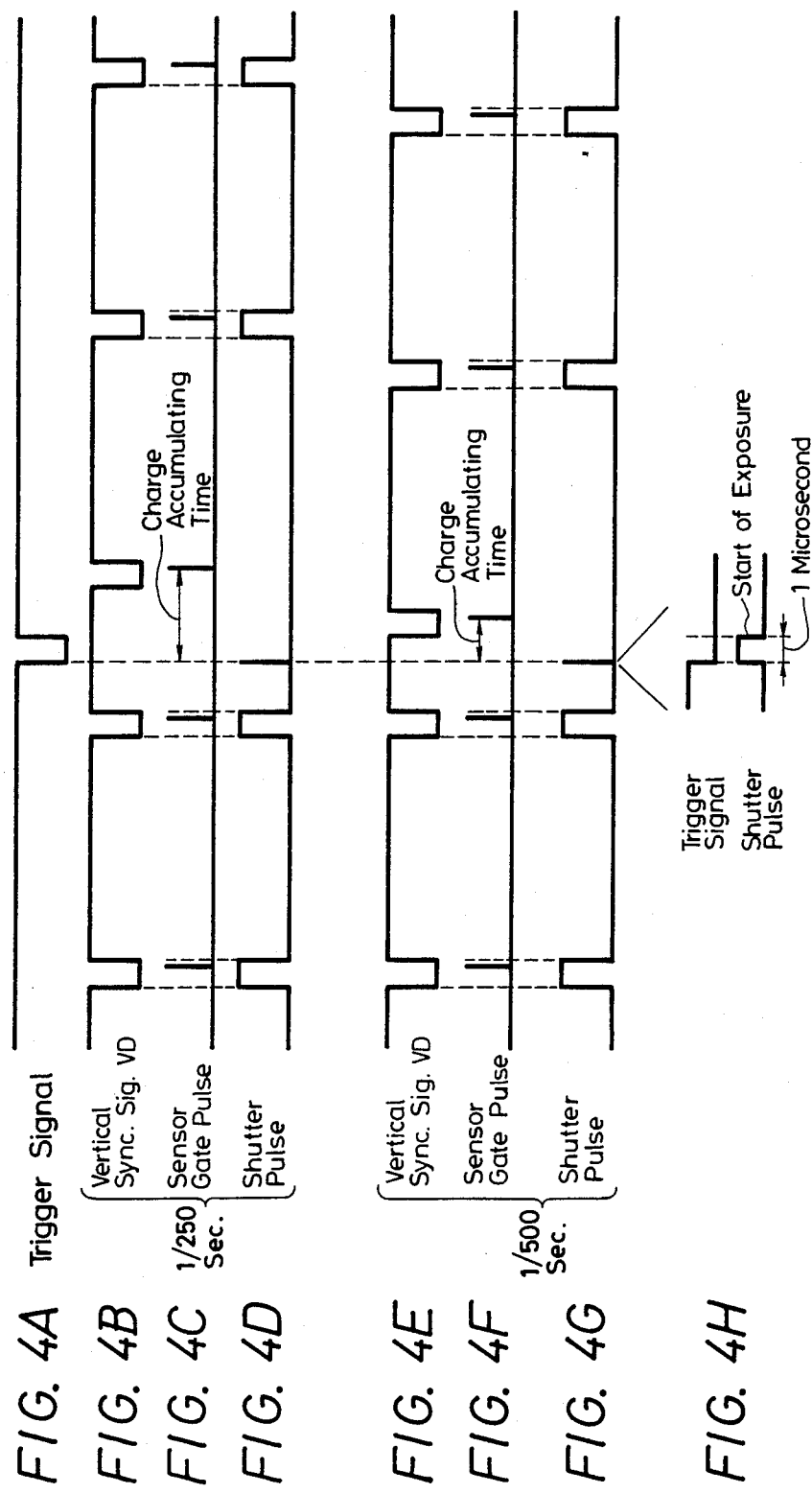

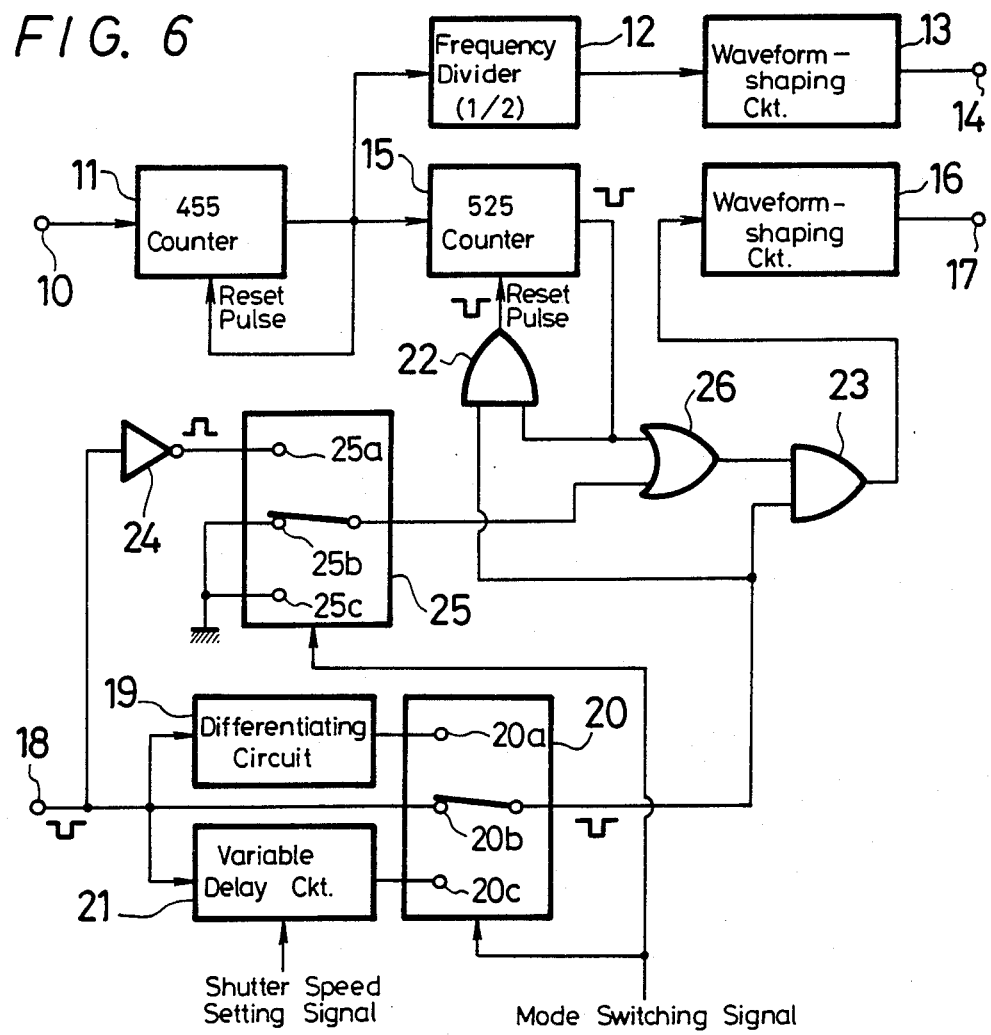

VIDEO CAMERA SHUTTER CONTROL BY CHARGE ACCUMULATION TIME OF CCD IMAGES

BACKGROUND OF THE INVENTION

1. Field of the Invention

The present invention relates generally to a charge-coupled imager of inter-line transfer type and more particularly to a charge-coupled imager of inter-line transfer type suitable for use with a video processing apparatus such as a machine-vision in which an electronic shutter is controlled by varying an effective charge accumulating time of a charge-coupled device (CCD) without man's visual sense and so on.

2. Description of the Prior Art

Japanese Patent Application No. 61-252375 describes a solid-state imager in which an exposure time can be electrically controlled without a mechanical shutter. In such electronic shutter for a solid-state imager, the electronic shutter is driven by varying a time in which a charge is accumulated in a sensor or charge accumulating region of a charge-coupled device. The charge accumulated in the charge accumulating region is transferred therefrom to a vertical register in response to a sensor gate pulse. In other words, a duration in which the supply of a shutter pulse is inhibited and a next sensor gate pulse is applied is represented as an exposure time of shutter, and this exposure time can be varied.

FIGS. 1A to 1E are timing charts to which reference will be made in explaining an operation of the above-described electronic shutter. A sensor gate pulse shown in FIG. 1C is generated in synchronism with a vertical synchronizing signal VD of FIG. 1A. A charge accumulated is transferred from a sensor to a vertical register in response to the sensor pulse supplied. Shutter pulses shown in FIGS. 1D and 1E are supplied to the charge-coupled imager in response to a horizontal synchronizing signal HD of FIG. 1B. When the shutter pulse is supplied, the charge accumulated in the charge accumulation region is delivered to an overflow-drain (OFD) of the charge-coupled device. The shutter pulse is not generated in the charge accumulating time so that a time period in which the generation of the shutter pulse is inhibited is longer in the shutter pulse of 1/500 second than that of the shutter pulse of 1/1000 second. Examining the shutter speeds of 1/500 second and 1/1000 second with reference to FIG. 1, it is to be understood that the ending time of the charge accumulating time is constant and that the shutter speed is varied by changing the timing of the charge accumulating time.

According to the prior-art charge-coupled imager, the ending time of the charge accumulating time is fixed and the starting time of the charge accumulating time is varied. There is then presented such a problem that, when a cameraman takes a picture in a high-speed mode by the use of a so-called machine vision or the like, the cameraman can not capture an object while the charge accumulation is started. Further, in a still camera or the like, a shutter speed is determined by varying the ending time of the exposure time. From this shutter standpoint, it is natural that while the charge accumulating time is determined, the ending time of the charge accumulating time is varied, which is particularly desired by a video camera apparatus such as a machine-vision or the like.

Furthermore, it is proposed to vary the ending time of the charge accumulating time by utilizing a charge-coupled imager of a so-called frame inter-line transfer-type which is the combination of the inter-line transfer type and the frame-transfer type. This previously-proposed technique costs very much.

OBJECTS AND SUMMARY OF THE INVENTION

Accordingly, it is an object of the present invention to provide an improved charge-coupled imager of inter-line transfer type which can eliminate the defects encountered with the prior art.

More specifically, it is an object of the present invention to provide an inexpensive charge-coupled imager of inter-line transfer type in which a shutter speed can be varied by varying the ending time of the charge accumulating time while the starting time of the charge accumulating time is made constant.

It is another object of the present invention to provide a charge-coupled imager of inter-line transfer type which can be suitably applied to a machine-vision or the like.

It is still another object of the present invention to provide a charge-coupled imager of inter-line transfer type in which the accumulating time starts in response to a trigger signal generated from a machine-vision system or the like.

According to an aspect of the present invention, there is provided an electronic shutter for a charge-coupled imager having a charge-coupled imager of inter-line transfer type including charge accumulating region for accumulating charge corresponding to an incident light, a drain region, control means for controlling the discharge of the accumulated charge to the drain region, and a read-out device for reading out the accumulated charge and for generating a video signal corresponding to the accumulated charge, a trigger signal input terminal supplied with a trigger signal, a shutter speed setting data input terminal supplied with shutter speed setting data and a timing signal generator supplied with the trigger signal and the shutter speed setting data and for generating a timing signal supplied to the charge coupled imager such that the charge accumulation starts in synchronism with the trigger signal and lasts during the time determined by the shutter speed setting data.

These, and other objects, features and advantages of the present invention will be apparent in the following detailed description of a preferred embodiment when read in conjunction with the accompanying drawings, in which like reference numerals are used to identify the same or similar parts in the several views.

BRIEF DESCRIPTION OF THE DRAWINGS

FIG. 2 is a schematic block diagram showing an arrangement of a charge-coupled imager according to an embodiment of the present invention;

FIGS. 3A and 3B are timing charts to which reference will be made in explaining an operation of the charge-coupled imager of FIG. 2, respectively;

FIGS. 4A to 4H are timing charts to which reference will be made in explaining an operation of the charge-coupled imager of the present invention in the real shutter mode, respectively;

FIGS. 5A to 5C are timing charts to which reference will be made in explaining an operation of the shutter used in the charge-coupled imager of the present invention in the long exposure mode, respectively;

FIG. 6 is a block diagram showing a concrete example of a circuit arrangement of a sync. generator circuit used in FIG. 2.

DETAILED DESCRIPTION OF A PREFERRED EMBODIMENT

Figure 1:
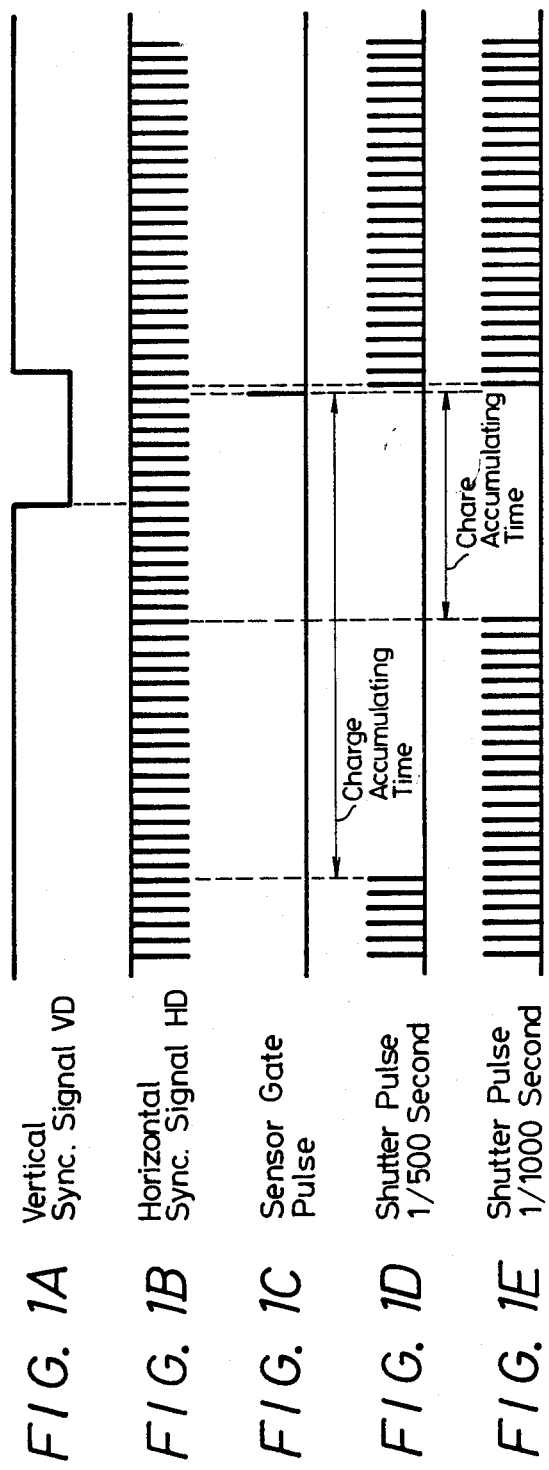
FIGS. 1A to 1E are timing charts to which reference will be made in explaining an operation of a charged-coupled imager according to the prior art, respectively.

An embodiment of the present invention will now be described with reference to FIGS. 2 to 7.

FIG. 2 shows an overall arrangement of this embodiment. As shown in FIG. 2, a charge-coupled device (CCD) 1 is provided to generate an imager signal, and this imager signal is processed by an image processor circuit 2. An output of the image processor circuit 2 is fed to an output terminal 3. A trigger signal is applied to an input terminal 4, and fed to a sync. (synchronizing) generator 5. The sync. generator 5 generates a composite synchronizing signal to be fed to the image processor circuit 2. The sync. generator 5 also supplies a timing pulse generator circuit 6 with vertical and horizontal synchronizing signals. The timing pulse generator circuit 6 generates various pulses, such as, a clamping pulse and a sampling pulse to be fed to the image processor circuit 2 and a drive pulse, a sensor gate pulse and a shutter pulse to be fed to the CCD 1.

In the present invention, let us consider a restart reset mode in which a vertical synchronizing signal VD is generated in synchronism with the application of the trigger signal, a real shutter mode in which a starting time of exposure time (charge accumulating time) is fixed and the ending time thereof can be varied, and a long exposure mode in which a long exposure is made possible, as will be described more fully later.

When a trigger signal shown in FIG. 3A is applied to the sync. generator 5 from the input terminal 4 in the restart reset mode, the sync. generator 5 generates a vertical synchronizing signal VD shown in FIG. 3B in synchronism therewith.

When a trigger signal shown in FIG. 4A is applied to the sync. generator 5 and the timing generator circuit 6 from the input terminal 4 in the real shutter mode, the timing pulse generator circuit 6 supplies, in synchronism with the trigger signal, the CCD 1 with one shutter pulse whose pulse width is narrow as shown in FIGS. 4D and 4G. This shutter pulse of narrow pulse width indicates the starting time of the charge accumulating time (exposure time). While, the sync. generator circuit 5 supplies the timing pulse generator circuit 6 with a vertical synchronizing signal VD shown in FIGS. 4B and 4E with a predetermined delay time from the trigger signal. Then, the timing pulse generator circuit 6 generates, in synchronism with the vertical synchronizing signal VD, a sensor gate pulse shown in FIGS. 4C and 4F. This sensor gate pulse is fed to the CCD 1. The sensor gate pulse is timed to occur when the charge accumulating time (exposure time) is terminated.

While in the aforementioned restart reset mode the vertical synchronizing signal VD is immediately generated with the application of the trigger signal, in the real shutter mode, the ending time of the charge accumulating time (exposure time) is varied by delaying the vertical synchronizing signal VD by a predetermined delay time, thus making it possible to provide an electronic shutter in which the exposure is started with the application of trigger signal and a shutter speed is changed by varying the ending time of the exposure time.

While in the long exposure mode the sync. generator 5 generates a vertical synchronizing signal in synchronism with the trailing and leading edges of the trigger signal (see FIG. 5A) applied to the input terminal 4, the vertical synchronizing signals, inserted into that period, or the period between the trailing and leading edges of the trigger signal, are masked or dropped as shown in FIG. 5b, whereby the exposure time substantially falls in a range of from the trailing to leading edges of the trigger signal, thereby the long exposure is made possible.

FIG. 6 shows an example of a concrete circuit arrangement of the sync. generator 5 shown in FIG. 2.

Referring to FIG. 6, a clock signal of 14.31818 MHz (4 fsc) is supplied to an input terminal 10 if an imager signal is according, for example, to the NTSC system. A counter 11 is provided to count 455 times the clock signal applied to the input terminal 10, and generates at an output side thereof a signal ($2f_H$) having a twice horizontal frequency of 31.47 kHz. The counter 11 is reset by an output signal thereof when it counts the clock signal 455 times. A frequency divide-by-2 circuit 12 is provided to divide the output signal of the counter 11 by 2, and generates at an output side thereof a signal ($f_H$) having a horizontal frequency of 15.73 kHz. The thus obtained signal therefrom is supplied to a waveform shaping circuit 13, and is thereby waveform-shaped, which is fed to an output terminal 14 as a horizontal synchronizing signal. The pulse width of this horizontal synchronizing signal is about 6.6 microseconds.

A counter 15 is provided to count 525 times the output signal of the counter 11. The counter 15 generates at an output side thereof a vertical synchronizing signal which is substantially interlaced, and the pulse width of this vertical synchronizing signal is about 572 microseconds. Similarly to the counter 11, the counter 15 is reset by the output signal thereof when it counts the output signal of the counter 11 525 times.

A trigger pulse is applied to an input terminal 18. The input terminal 18 is connected to a fixed contact 20a of a switching circuit 20 via a differentiating circuit 19 which generates a differentiated pulse in synchronism with the trailing and leading edges of the trigger signal. Further, the input terminal 18 is connected directly to a fixed contact 20b of the switching circuit 20, and is also connected to a fixed contact 20c of the switching circuit 20 via a variable delay circuit 21 whose delay time is determined by a shutter speed setting signal which will be described later. A common terminal (output terminal) of the switching circuit 20 is connected to one-input terminal of each of AND circuits 22 and 23.

Furthermore, the input terminal 18 is connected through an inverter 24 to a fixed contact 25a of a switching circuit 25, whereas fixed contacts 25b and 25c of the switching circuit 25 are connected together and then grounded A common terminal (output terminal) of the switching circuit 25 is connected to one input terminal of an OR circuit 26, whereas the other input terminals of the OR circuit 26 and the AND circuit 22 are connected to the output side of the counter 15. An output terminal of the OR circuit 26 is connected to the other input terminal of the AND circuit 23, whereas the output terminal of the AND circuit 23 is connected through a waveform-shaping circuit 16 to an output terminal 17.

The switching circuits 20 and 25 are changed in position in response to a mode switching signal. For example, in the long exposure mode, the switching circuits 20 and 25 are connected to the fixed contacts 20a and 25a; in the restart reset mode, they are connected to the fixed contacts 20b and 25b; and in the real shutter mode, they are connected to the fixed contacts 20c and 25c, respectively.

In the restart reset mode, the common terminal of the switching circuit 25 is grounded via a fixed contact 25b, and the common terminal of the switching circuit 20 is connected to its fixed contact 20b. Thus, when the trigger signal (see FIG. 3A) is applied to the input terminal 18, the trigger signal is supplied through the fixed contact 20b of the switching circuit 20 and the AND circuit 23 to the waveform-shaping circuit 16, in which it is waveform-shaped and provided as the vertical synchronizing signal shown in FIG. 3B. The trigger pulse, passed through the fixed contact 20b of the switching circuit 20, is also supplied through the AND circuit 22 to the counter 15 as a reset signal so that the counter 15 is reset. The counter 15 begins to count the output signal of the counter 11 from a time point in which it is reset. When counting the output signal of the counter 11 525 times, the counter 15 generates a count output. This count output is supplied through the OR circuit 26 and the AND circuit 23 to the waveform-shaping circuit 16, thereby sequentially generating at the output terminal 17 a desired vertical synchronizing signal of a predetermined interval from the vertical synchronizing signal.

In the real shutter mode, the common terminal of the switching circuit 25 is similarly grounded via its fixed contact 25c, and the common terminal of the switching circuit 20 is connected to its fixed contact 20c. Thus, when the trigger signal (see FIG. 4A) is applied to the input terminal 18, this trigger signal is supplied to the variable delay circuit 21, in which it is delayed by a predetermined delay time in response to the shutter speed. Then, the delayed trigger signal is supplied through the AND circuit 23 and is developed at the output terminal 17 as the vertical synchronizing signal. Simultaneously, the delayed trigger signal is supplied through the AND circuit 22 to the counter 15 as a reset signal and thereby the counter 15 is reset. FIGS. 4B and 4E respectively illustrate the conditions that the vertical synchronizing signals, delayed by the trigger signal, are generated when the shutter speed is 1/250 second and 1/500 second. From FIGS. 4B and 4E, it is clear that the starting point of the charge accumulating time is fixed, while the ending point thereof can be varied.

In the long exposure mode, the common terminals of the switching circuits 20 and 25 are respectively connected to their fixed contacts 20a and 25a. When a trigger signal (see FIG. 5A) is applied to the input terminal 18, this trigger signal is supplied to the differentiating circuit 19, from which there are derived differentiated pulses (not shown) in synchronism with the trailing and leading edges of the trigger signal. The thus differentiated pulse is supplied through the AND circuit 23 to the waveform-shaping circuit 16, in which it is waveform-shaped and is developed as the vertical synchronizing signal shown in FIG. 5B. The trigger signal applied to the input terminal 18 is inverted by the inverter 24, and the inverted trigger signal is supplied through the fixed contact 25a of the switching circuit 25 to one input terminal of the OR circuit 26. In that case, the level at one input terminal of the OR circuit 26 is at high (H) level so that the output signal supplied to the other input terminal of the OR circuit 26 from the counter 15 is ignored. Thus, the output signal is substantially masked as shown by a broken line in FIG. 5B. While the exposure time (charge accumulating time) in the real shutter mode or in the normal shutter mode and so on is 1/60 second per field at maximum, the exposure time longer than the above becomes possible.

Figure 7:
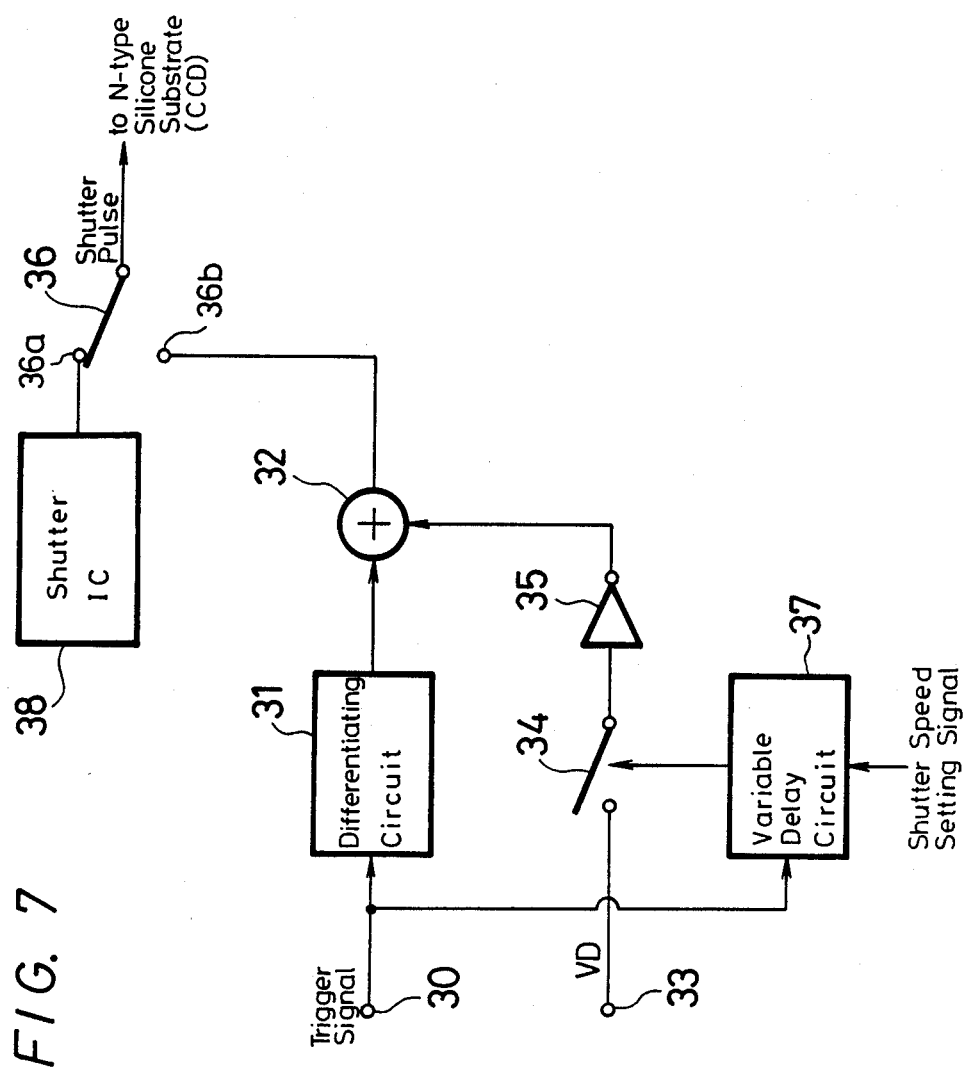
FIG. 7 is a block diagram showing a concrete circuit arrangement of the timing pulse generator circuit of FIG. 2, and to which reference will be made in explaining the operation of generating a shutter pulse.

FIG. 7 is a block diagram showing an example of a main portion of the present invention by which the timing pulse generator circuit 6 (see FIG. 2) generates a shutter pulse.

Referring to FIG. 7, a trigger signal (see FIG. 4A) is applied to an input terminal 30. This trigger signal is supplied to a differentiating circuit 31 from which there is derived a shutter pulse having a narrow pulse width, for example, 1 microsecond as shown in FIG. 4H. Note that the charge accumulation, i.e., exposure is started from the trailing edge of this shutter pulse. The shutter pulse of narrow pulse width, derived from the differentiating circuit 31, is supplied to one input terminal of an adder circuit 32.

The vertical synchronizing signal VD is supplied to an input terminal 33. The vertical synchronizing signal VD applied to the input terminal 33 is supplied through a switch 34 to an inverter 35 and is thereby inverted. The resultant inverted vertical synchronizing signal is supplied to the other input terminal of the adder circuit 32 as a normal shutter pulse synchronized with the vertical synchronizing signal. The adder circuit 32 therefore generates at an output side thereof a shutter pulse whose waveform is shown in FIGS. 4D and 4G. This shutter pulse is supplied through a fixed contact 36b of a switch 36 to an N-type silicone substrate of the charge-coupled imager 1 (see FIG. 2), and a charge in the sensor is delivered to a substrate which functions as an overflow-drain (OFD) region.

In order that the shutter pulse may not be generated in synchronism with the vertical synchronizing signal which is generated with a predetermined delay time from the trigger signal, there is provided a variable delay circuit 37. The variable delay circuit 37 is supplied with the trigger signal from the input terminal 30, and forms a delay signal having a predetermined pulse width. This delay signal is supplied to the switch 34 as an OFF signal so that the switch 34 is turned OFF so as to inhibit the vertical synchronizing signal, generated with the predetermined delay time from the trigger signal, from being passed therethrough. The shutter speed setting signal is also supplied to the variable delay circuit 37 so that the delay signal (OFF signal), formed by the variable delay circuit 37, may be varied in response to the shutter speed.

In FIG. 7, reference numeral 38 designates a prior-art shutter integrated circuit (IC) which makes the ending point of the charge accumulating time constant while making its starting time variable. An output of the shutter IC 38 is supplied through the fixed contact 36b of the switch 36 to the N-type silicone substrate of the charge-coupled imager 1.

As described above, in the real shutter mode, the charge accumulating time is determined by the shutter pulse of narrow pulse width, the ending point of the charge accumulating time is determined by the vertical synchronizing signal, and the vertical synchronizing signal can be varied in response to the shutter speed with the result that the ending time of the charge accumulating time can be varied in response to the shutter speed.

As set out above, according to the present invention, the charge accumulation is started in synchronism with the trigger signal applied from the outside and the charge is accumulated during a period of time determined by the shutter speed setting signal, whereby the completion of the charge accumulating time (exposure time) can be varied. Therefore, the charge-coupled imager of inter-line transfer type of the invention can be made inexpensive and applied to a video processing apparatus such as a so-called machine-vision in which man's visual sense is not assumed.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

I claim as my invention:

1. An electronic shutter for a charge-coupled imager comprising:
    (a) a charge-coupled imager of inter-line transfer type including charge accumulating region for accumulating charge corresponding to an incident light, a drain region, control means for controlling the discharge of said accumulated charge to said drain region, and read-out means for reading out said accumulated charge and for generating a video signal corresponding to said accumulated charge;
    (b) a trigger signal input terminal supplied with a trigger signal;
    (c) a shutter speed setting data input terminal supplied with shutter speed setting data; and
    (d) timing signal generator means supplied with said trigger signal and said shutter speed setting data and for generating a timing signal supplied to said charge-coupled imager such that said charge accumulation starts in synchronism with said trigger signal and lasts during the time determined by said shutter speed setting data.

2. An electronic shutter according to claim 1, wherein said timing signal generator means generates a first pulse in synchronism with said trigger signal, said first pulse being supplied to said control means to discharge the accumulated charge in said charge accumulating region to said drain region and generates a second pulse determined by said trigger signal and said shutter speed setting data, said second pulse being supplied to said read-out means to read-out the accumulated charge.

3. An electronic shutter according to claim 2, wherein said read-out means includes charge transfer means, and said timing signal generator means further includes horizontal pulse generator means for generating a horizontal pulse having a horizontal scanning frequency, vertical pulse generator means for generating a vertical pulse having a vertical scanning frequency, and clock signal generator means for generating clock signals from said horizontal and vertical pulses, said clock signals being supplied to said charge transfer means.

4. An electronic shutter according to claim 3, wherein said second pulse is generated in synchronism with said vertical pulse and said vertical pulse is generated at a timing determined by said trigger signal and said shutter speed setting data.

5. An electronic shutter according to claim 4, wherein said vertical pulse generator means includes counter means for counting a pulse relating to said horizontal pulse and for generating an output when said pulses of a predetermined number are counted, said counter means having a reset terminal, variable delay means for delaying said trigger signal by a duration determined by said shutter speed setting data, reset signal generating means for generating a reset signal from the output of said counter means and the output of said variable delay means, said reset signal being supplied to said reset terminal, and wave shaping means for shaping said reset signal to generate said vertical pulse.

* * * * *